Sept. 6, 1932.  P. V. WHITNEY  1,875,535
COMBINED TROLLEY CONVEYER TAKE-UP AND TELESCOPIC TRACK
Filed Oct. 22, 1930   3 Sheets-Sheet 1
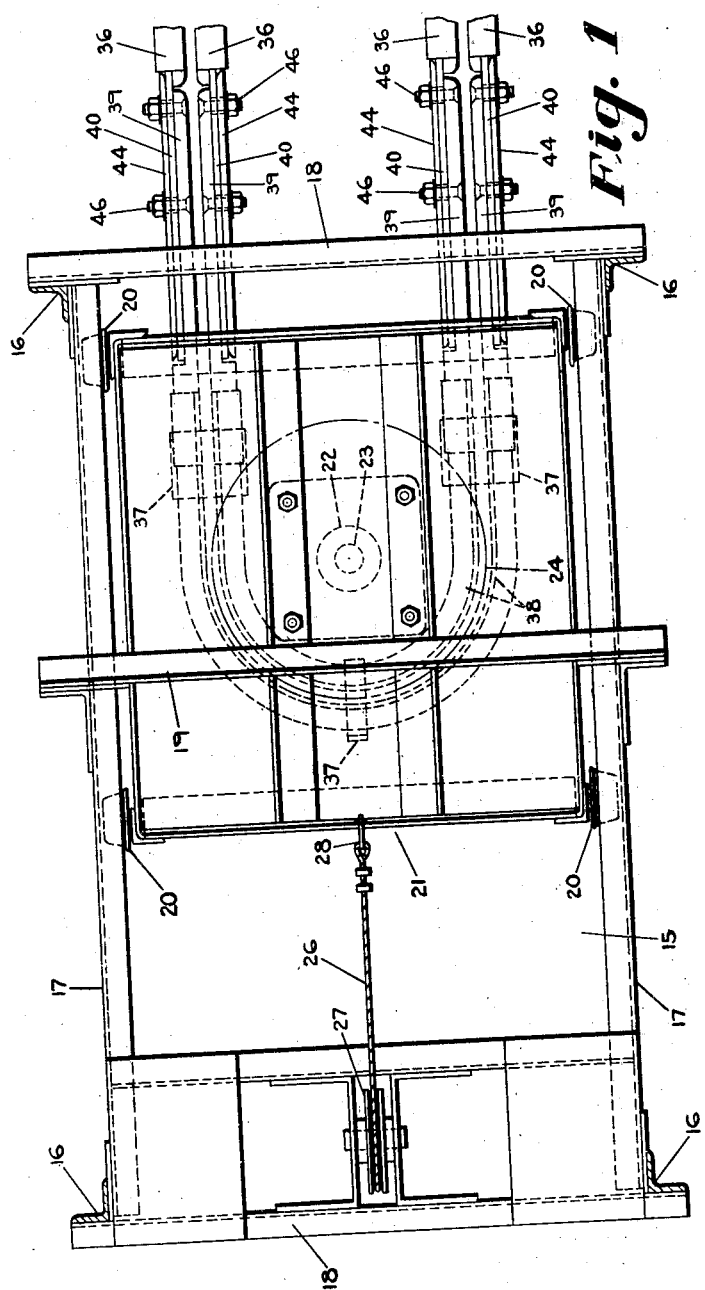
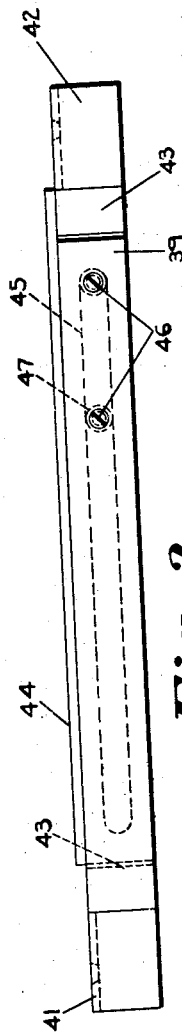
INVENTOR
Paul V. Whitney.

Sept. 6, 1932.   P. V. WHITNEY   1,875,535
COMBINED TROLLEY CONVEYER TAKE-UP AND TELESCOPIC TRACK
Filed Oct. 22, 1930   3 Sheets-Sheet 2
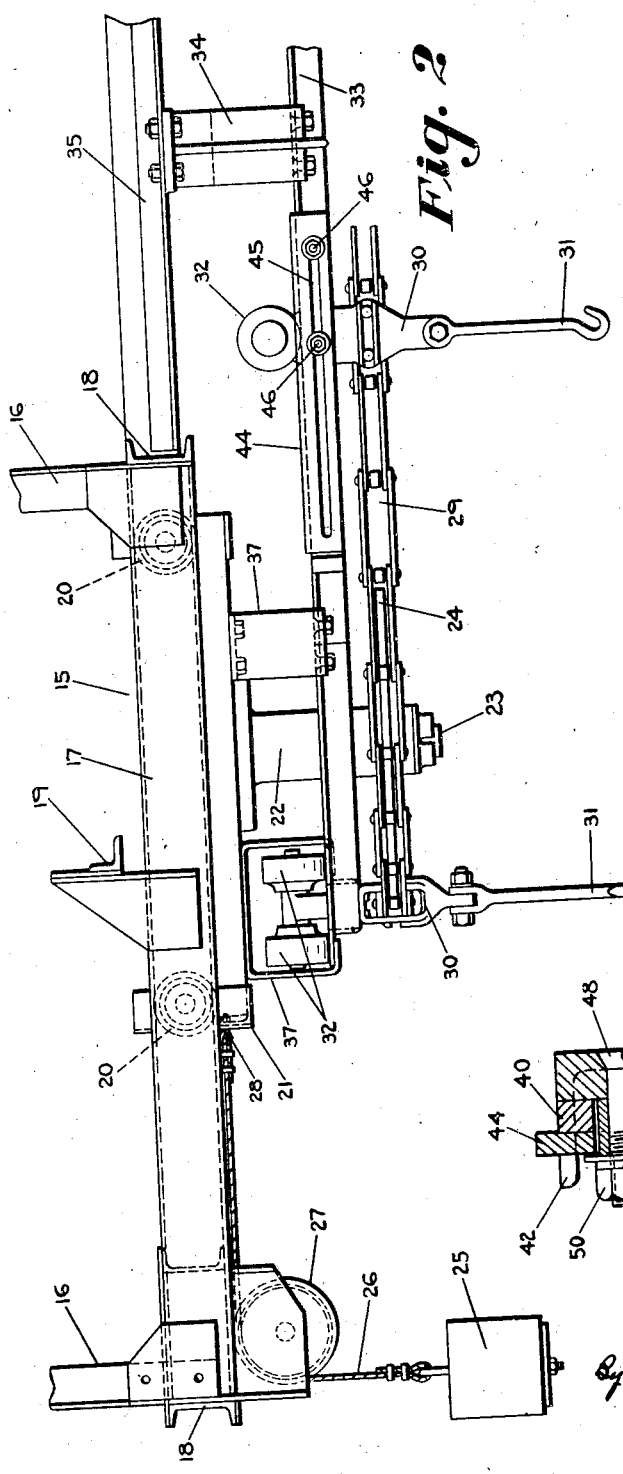
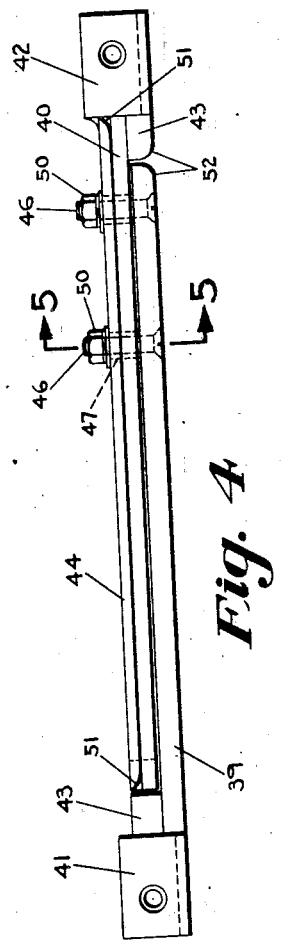
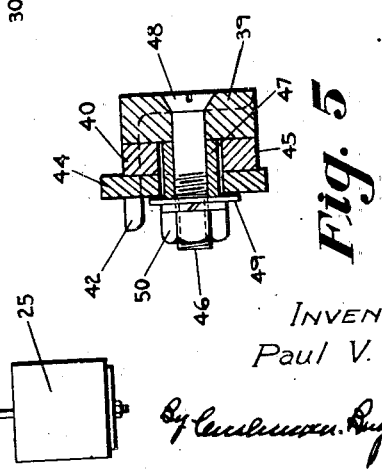
INVENTOR
Paul V. Whitney.

Sept. 6, 1932.  P. V. WHITNEY  1,875,535
COMBINED TROLLEY CONVEYER TAKE-UP AND TELESCOPIC TRACK
Filed Oct. 22, 1930   3 Sheets-Sheet 3
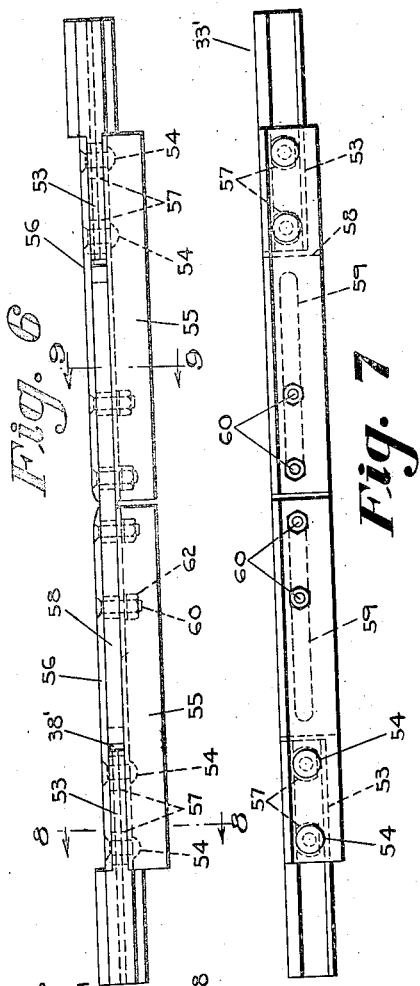
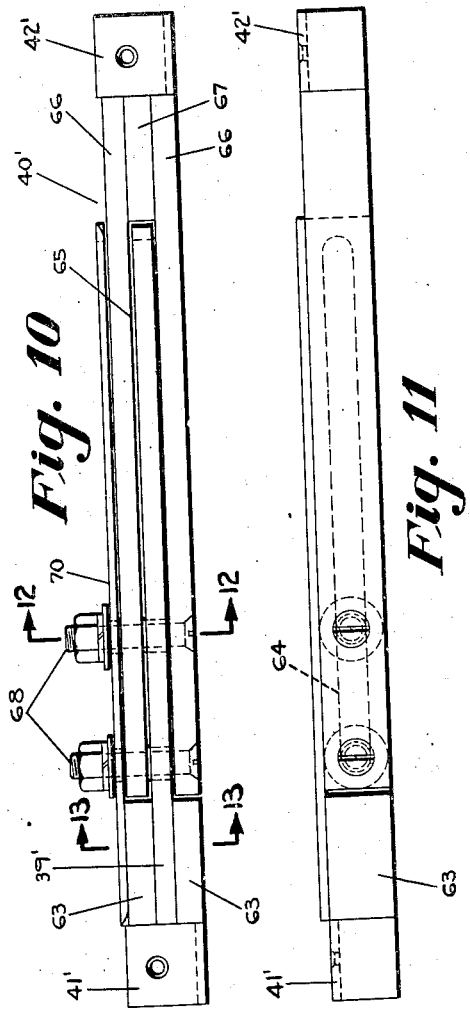
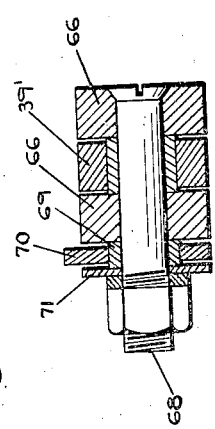
INVENTOR
Paul V. Whitney Patented Sept. 6, 1932

1,875,535

UNITED STATES PATENT OFFICE

PAUL V. WHITNEY, OF COLUMBUS, OHIO, ASSIGNOR TO THE JEFFREY MANUFACTURING COMPANY, OF COLUMBUS, OHIO, A CORPORATION OF OHIO

COMBINED TROLLEY CONVEYER TAKE-UP AND TELESCOPIC TRACK

Application filed October 22, 1930. Serial No. 490,524.

In overhead or trolley conveyers comprising a draft member supported by wheeled hangers or carriages which are propelled along trackways, it is sometimes necessary to extend the trackways throughout the entire travel of the draft member, and especially around curves, defined by sprockets for driving and guiding the draft member, when relatively heavy loads are suspended from the hangers or carriages. Whether these trackways are extended through-out the entire travel of the draft member or not, it is always desirable in such conveyers to provide means for automatically tensioning the draft member to maintain it in proper driving relation to the sprockets.

To accomplish these objects it is necessary to render the trackways adjustable to compensate for the adjustments made in taking up slack in the draft member. It is therefore the important object of this invention to provide means for automatically adjusting the trackway as slack in the draft member is automatically taken up.

Another important object of the invention is to mount the guide or drive sprocket in an automatically movable carriage for maintaining the draft member under the proper tension, operating in conjunction with the trackway, which can be extended or retracted according to the tension placed on the draft member.

Another important object of the invention is to provide a telescopic trackway of simple construction which is strong, durable and ably capable of sustaining the weight of trolley carriages movable thereover.

Other objects and advantages of the invention will become apparent during the course of the following description.

In the accompanying drawings, forming a part of the description, and wherein like numerals are employed to designate like parts throughout the several views, Figure 1 is a plan view of the combined take-up mechanism and telescopic trackway, Figure 2 is a side elevation of a device shown in Figure 1, Figure 3 is an enlarged elevational view of one form of telescopic track section shown in Figure 1, Figure 4 is a plan of the same, Figure 5 is an enlarged transverse section taken on the line 5—5 of Figure 4, Figure 6 is a top plan of a modified form of telescopic trackway employing T rails for tracks, Figure 7 is a side elevation of the same, Figure 8 is an enlarged transverse section taken on the line 8—8 of Figure 6, Figure 9 is a similar section taken on the line 9—9 of Figure 6, Figure 10 is a top plan of a further modification of the telescopic trackway employing an angle iron track, Figure 11 is a side elevation of the same, Figure 12 is an enlarged transverse section taken on the line 12—12 of Figure 10, and Figure 13 is a similar section taken on the line 13—13 of Figure 10.

Referring now more particularly to Figures 1 to 5 of the drawings, the numeral 15 designates a stationary frame fixed to the building in which the apparatus is installed at a point where slack in the conveyer chain is apt to occur. This frame is suitably supported by any suitable type of structural work 16, and is rectangular in shape. The frame 15 comprises a pair of elongated spaced parallel channel beams 17 having their flanges facing each other in horizontal planes, the lower flanges of which form trackways. These beams are connected at their ends by cross braces 18 and at an intermediate point by a transversely extending cross brace 19.

Adapted to ride upon the lower horizontal flanges of the channel beam 17 are the wheels 20 of a take-up carriage 21 having depending therefrom in a suitable bearing 22, a shaft 23 with a horizontally disposed sprocket 24 secured thereto. This carriage is normally disposed adjacent one end of the frame 15 and normally urged toward the opposite end thereof by a counterweight 25 suspended from a flexible cable 26 trained over a sheave wheel 27 mounted in the frame 15 and then directed horizontally to be attached as at 28 to the carriage.

A trolley conveyer chain 29 is trained about the sprocket 24 and is provided at spaced intervals throughout its length with trolley hangers 30 having load carriers 31 depending therefrom to support and transport loads suspended therefrom. In order to support these loads by means other than the conveyer chain, the trolley hangers 30 are provided with one or more trolley wheels 32 adapted to ride upon the well-known type of stationary trackway 33 suspended by suitable hangers 34 from any suitable framework 35 found available at the point of installation. This stationary trackway is composed of a pair of tread portions 36 as shown in Figure 1, spaced apart for the disposition of the trolley hangers 30 therebetween. In Figures 1 to 5 inclusive, this stationary trackway is made up of pairs of angle irons as shown, but it is to be understood that the form assumed by this trackway is dependent upon the loads designed to be sustained thereby and the character of work adapted to be performed by the conveyer.

Suspended from the carriage 21 of the take-up mechanism, by means of hangers 37, is a movable trackway 38 of the same construction as the stationary trackway 33, but curved in a horizontal plane above a sprocket 24 so as to support the wheels 32 of the trolley hangers as they are moved about the sprocket. This movable trackway 38 moves with the adjustments of the take-up carriage 21 as is understood, and in order to form a continuation of the stationary trackway 33, is adjustably connected thereto by means of the telescopic track arrangement which will now be described.

In Figures 1 to 5 inclusive, one form of this telescopic trackway is disclosed and is formed by a pair of juxtaposed slidably associated bars 39 and 40 welded at their outer ends to angle clips 41 and 42 respectively. Filler blocks 43 are welded to the clips and their respective bars at their junctures, as shown, to reinforce the structure and to provide enlarged wheel tread portions. The angle clip 41 is connected to the movable trackway 38 by being bolted and welded to an adjacent hanger 37, as shown in Figure 2, while the angle clip 42 is similarly connected to the adjacent hanger 34 to form a continuation of the stationary trackway 33. A vertically disposed guard rail 44 is welded to the outside face of the bar 40 and its upper margin extends a distance above the top tread surfaces of the bars 39 and 40 to prevent undue lateral movement of the wheels or rollers 32 of the trolley hangers in passing over the adjustable track section. This guard rail and bar 40 are equipped with elongated longitudinally extending aligned slots 45 through which pass a pair of transverse elements in the form of bolts 46 to operatively connect the bars and permit their relative longitudinal movement. Spacing collars 47 are mounted upon the bolts and disposed in the slots 45 of the bar and guide rail as shown best in Figure 5, and prevent the bolts 46 from clamping the bars together and prohibiting relative movement thereof. From Figure 5, it will be observed that the heads 48 of the bolts are countersunk in the relative inner face of the bar 39 so that no obstruction will be presented to the hangers as they move between the two tread portions 36. Washers 49 are positioned upon the bolts 46 to engage the outer end of the spacing collars 47, and nuts 50 secure these washers in position and are prohibited from clamping the bars 39 and 40 into frictional engagement. By reason of this construction, the bar 39 may move longitudinally of the bar 40 as the movable trackway 38 moves with the take-up carriage so as to extend the telescopic trackway according to movement of the take-up carriage 21 without disturbing continuity of the trackway for the trolley hangers. During this extension of the telescopic track section, it will be evident that the bolts 46 and spacing collars 47 move longitudinally through the slots 45 in the bar 40 and guard rail 44 and being spaced horizontally, prevent sagging of this track section. From Figure 4, it will be observed that the ends 51 of the guard rail are bevelled or slightly curved to avoid interference with the trolley wheels and likewise the outer end of the bar 39 and the adjacent end of the filler block 43 are bevelled or curved as at 52 to prevent similar obstructions to the trolleys.

The modification shown in Figures 6, 7, 8 and 9 is generically the same as shown in the preceding figures. In this instance, these trackways are constituted by I-shaped rails, the ends of which are reduced in width by cutting away the base flanges and tread portion to form reduced longitudinally extending extensions 53. To opposite faces of each reduced extension 53 are secured, by countersunk bolts 54, a pair of plates 55 and 56. These plates extend a substantial distance beyond the end of the extension 53 to constitute a bifurcated element. The plate 55 in this instance is in the form of an angle beam, whereas the plate 56 is unflanged. In order to build out the web of the I rail, fillers or washers 57 are positioned on the bolts 54 between the web of the rail and the plates 55 and 56. Obviously, the horizontal flange of the angle beam 55 provides a laterally enlarged tread portion for the extensible track.

Slidably mounted in the bifurcation formed between both of the plates 55 and 56, is a bar 58 equipped on opposite sides of its center with a pair of elongated longitudinally extending slots 59. A pair of countersunk bolts 60 extend through the plates 56, each slot 59, and then through the vertical flanges of the angle beams 55. As shown in Figure 9, a spacing collar 61 is positioned upon each bolt and operates in the slot 59 when the movable trackway moves relative to the stationary trackway 33'. These spacing collars are provided to maintain sliding relationship between the bar 58 and bifurcated extensions of the trackways when the nuts 62 are driven home on the bolts to clamp the parts in operative position. From the foregoing, it will be evident that when the movable trackway 38 moves to the left of Figure 7, the bolts 60 associated with the bifurcated extension of trackway 38' will move through the slot 59 in the left hand end of bar 58 until the end of the slot is encountered thereby. Upon further movement in the same direction, the bar 58 will be caused to move to the left of the figure, moving the right end slot 59 toward the left of the figure to afford a wide range of movement for the movable trackway.

In the modification shown in Figures 10 to 13 inclusive, the telescopic track section comprises angle clips 41' and 42' secured respectively to the movable and stationary trackways in the same manner as the clips 41 and 42 of the modification shown in Figure 3. Welded to the clip 41' is a longitudinally extending plate 39', which plate is reinforced in its attachment to the clip by means of filler blocks 63 welded thereto and to the clip 41' at the juncture of these two members as shown. This bar 39' is equipped with an elongated longitudinally extending slot 64 and is adapted to be slidably mounted in the bifurcation 65 formed in an extension 40' of the stationary trackway. This bifurcation is formed by welding a pair of spaced parallel bars 66 to the angle clip 42' with a spacing block 67 interposed between them at their juncture with the clip. All of these parts are welded or riveted together in any suitable manner. A pair of bolts 68 are each countersunk in one of the bars 66 and extend through the slot 64 of the tongue 39' and then out through the other bar 66 to pass through spacing collars 69 mounted in apertures of a guard rail 70. This guard rail is welded at one end to one of the filler blocks 63 to extend in spaced parallel relation to the tongue bar 39' to serve as means for limiting lateral movement of the trolley carriages when traversing the telescopic track. Washers 71 are placed upon the bolts 68 and are forced into engagement with the spacing collars 69 by threading nuts thereon. This arrangement prevents the guard rail from being clamped against bar 66 while the spacing collars 69 prevent contraction of the bars 66 to obviate binding engagement being set up between these bars and the intermediate tongue bar 39'. From the foregoing, it will be obvious that whenever the movable trackway 38 moves relative to the stationary trackway, the tongue bar 39' will be moved lengthwise in the bifurcation between the bars 66, such movement being permitted by the longitudinal slotting 64 of the tongue bar.

It is to be understood that various changes in the construction and arrangement of parts may be resorted to without departing from the scope of the appended claims.

I claim:

1. A telescopic track comprising a pair of track sections, one of said sections having an element longitudinally slotted, and the other having longitudinally spaced transverse elements slidably mounted in said slot.

2. A telescopic track comprising a pair of track sections, one of said sections having a longitudinal extension of reduced width, the other section having a corresponding extension provided with a longitudinally extending slot and adapted to be juxtaposed with respect to said first named extension, and transverse elements extending from one section to be slidingly engaged in the slot of the other section.

3. A telescopic track comprising a pair of track sections, one of said sections having a longitudinal extension of reduced width, the other section having a corresponding extension provided with a longitudinally extending slot and adapted to be juxtaposed with respect to said first named extension, and bolts extending from one section through the slot in the other section.

4. A telescopic track comprising a pair of track sections, one of said sections having a longitudinal extension of reduced width, the other section having a corresponding extension provided with a longitudinally extending slot and adapted to be juxtaposed with respect to said first named extension, bolts extending from one section through the slot in the other section, and spacing collars on said bolts operating in said slot.

5. A telescopic track comprising a pair of track sections, one of said sections having a longitudinal extension of reduced width, the other section having a corresponding extension provided with a longitudinally extending slot and adapted to be juxtaposed with respect to said first named extension, a guard rail arranged beside said slotted extension, and bolts extending from the first named section through said slot and rail to secure the latter in position.

6. A telescopic track comprising a pair of track sections, one of said sections having a longitudinal extension of reduced width, the other section having a corresponding extension provided with a longitudinally extending slot and adapted to be juxtaposed with respect to said first named extension, and transverse elements extending from one section to be slidingly engaged in the slot of the other section, the adjacent ends of said extensions being inclined to avoid interference with the means movable upon said track.

7. A telescopic track comprising a pair of I-beam track sections, each of said sections having a longitudinal extension of reduced width, a pair of bars secured to opposite sides of each extension, a bar arranged between the pairs of bars and equipped with a longitudinally extending slot, and members bridging the space between said bars, and extending through said slot.

8. A telescopic track comprising a pair of track sections, one of said sections being longitudinally bifurcated, the other section having a longitudinal extension of reduced width slidably mounted in said bifurcation and provided with a longitudinally extending slot, a pair of bolts carried by said bifurcated extension and extending through said slot, and spacing collars on said bolts within said slot to space the arms of the bifurcated section apart.

9. A telescopic track comprising a pair of track sections, one of said sections being longitudinally bifurcated, the other section having a longitudinal extension of reduced width slidably mounted in said bifurcation and provided with a longitudinally extending slot, a guard rail arranged on one side of the bifurcated section, and a pair of bolts extending through said rail, the bifurcated section, and the slot to operatively connect said sections and rail.

10. A telescopic track comprising a pair of track sections, one of said sections being longitudinally bifurcated, the other section having a longitudinal extension of reduced width slidably mounted in said bifurcation and provided with a longitudinally extending slot, a guard rail arranged on one side of the bifurcated section, a pair of bolts extending through said rail, the bifurcated section, and the slot to operatively connect said sections and rail, spacing collars on said bolts between the arms of said bifurcated section and disposed in said slot, and other spacing collars carried by those portions of the bolts extending through said guard rail.

11. In a trolley conveyer system, a conveyer chain, a sprocket about which the chain is trained, means to adjust the sprocket to remove slack developed in the chain, stationary track sections, a track section curved about the sprocket and movable therewith, and telescoping means connecting the ends of the stationary sections with the ends of said curved section.

12. In a trolley conveyer system, a conveyer chain, a sprocket about which the chain is trained, means to adjust the sprocket to remove slack developed in the chain, stationary track sections, a track section curved about the sprocket and movable therewith, and telescoping means connecting the ends of the stationary sections with the ends of said curved section, said telescoping means comprising a longitudinally slotted member and a cooperating member having transverse elements slidably engaged in the slot.

13. In a trolley conveyer system, a conveyer chain, a sprocket about which the chain is trained, means to adjust the sprocket to remove slack developed in the chain, stationary track sections, a track section curved about the sprocket and movable therewith, and telescoping means connecting the ends of the stationary sections with the ends of said curved section, said telescoping means comprising a longitudinally bifurcated member and an elongated member slidable longitudinally in the bifurcation.

14. In a trolley conveyer system, a conveyer chain, a sprocket about which the chain is trained, means to adjust the sprocket to remove slack developed in the chain, stationary track sections, a track section curved about the sprocket and movable therewith, telescoping means connecting the ends of the stationary sections with the ends of said curved section, said telescoping means comprising a longitudinally slotted member and a cooperating member carrying transversely extending bolts slidably engaged in the slot, and a guard rail extending alongside one of said members and engaged by said bolts.

15. In a trolley conveyer system, a conveyer chain, a sprocket about which the chain is trained, means to adjust the sprocket to remove slack developed in the chain, stationary track sections, a track section curved about the sprocket and movable therewith, telescoping means connecting the ends of the stationary sections with the ends of said curved section, said telescoping means comprising a longitudinally slotted member and a cooperating member carrying transversely extending bolts slidably engaged in the slot, a guard rail extending alongside one of said members and engaged by said bolts, and spacing means preventing clamping of the guard rail on said slotted element.

16. In a trolley conveyer system, a stationary track, a carriage movable relative to said stationary track, a track carried by said carriage and telescopically connected to said stationary track, and a trolley conveyer chain extending longitudinally of said tracks.

17. In a trolley conveyer system, a stationary track, a carriage movable relative to said stationary track, a track carried by said carriage and telescopically connected to said stationary track, one of said tracks having an element longitudinally bifurcated and the other carrying an elongated member slidable longitudinally in said bifurcation, and a trolley conveyer chain extending longitudinally of said tracks.

18. In a trolley conveyer system, a stationary track, a carriage movable relative to said stationary track, a track carried by said carriage and telescopically connected to said stationary track, one of said tracks having an element longitudinally slotted and the other having transversely extending bolts slidable in the slot, spacing members on said bolts slidable in said slot to prevent binding action of the tracks, and a trolley conveyer chain extending longitudinally of said tracks.

19. In a trolley conveyer system, a stationary track, a carriage movable relative to said stationary track, a track carried by said carriage and telescopically connected to said stationary track, a trolley conveyer chain extending longitudinally of said tracks, and means tending to move the carriage in a direction to elongate the trackway constituted by said tracks.

In testimony whereof I have hereunto set my hand.

PAUL V. WHITNEY.